US011789688B1

(12) United States Patent
Singhal et al.

(10) Patent No.: US 11,789,688 B1
(45) Date of Patent: Oct. 17, 2023

(54) CONTENT PRESENTATION BASED ON ENVIRONMENTAL DATA

(71) Applicant: Apple Inc., Cupertino, CA (US)

(72) Inventors: Shruti Singhal, San Jose, CA (US); Pal Kristian Engstad, Los Angeles, CA (US); Tobias Eble, Sunnyvale, CA (US); Norman Nuo Wang, Saratoga, CA (US); Ivan Gavrenkov, Palo Alto, CA (US); Olivier Denis Roger Gutknecht, San Francisco, CA (US); Sabine Webel, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/172,307

(22) Filed: Feb. 10, 2021

Related U.S. Application Data

(60) Provisional application No. 63/000,099, filed on Mar. 26, 2020.

(51) Int. Cl.
  G06F 3/16 (2006.01)
  G06T 7/90 (2017.01)
  (Continued)

(52) U.S. Cl.
  CPC .......... G06F 3/16 (2013.01); G02B 27/0101 (2013.01); G06F 3/016 (2013.01); G06T 7/0002 (2013.01); G06T 7/90 (2017.01); G09G 5/36 (2013.01); G10L 25/51 (2013.01); H04R 1/028 (2013.01); G02B 2027/0141 (2013.01); G06T 2207/30168 (2013.01); G09G 2340/14 (2013.01); G09G 2360/144 (2013.01); H04R 2499/15 (2013.01)

(58) Field of Classification Search
  CPC ....... G06F 3/16; G06F 3/016; G02B 27/0101; G02B 2027/0141; G06T 7/0002; G06T 7/90; G06T 2207/0141; G09G 5/36; G09G 2340/14; G09G 2360/144; G10L 25/51; H04R 1/028; H04R 2499/15
  See application file for complete search history.

(56) References Cited

U.S. PATENT DOCUMENTS

2011/0316769 A1* 12/2011 Boettcher ............. G06F 1/1684
  345/156
2014/0267543 A1* 9/2014 Kerger .................... H04L 65/75
  348/14.02

(Continued)

FOREIGN PATENT DOCUMENTS

| CA | 3031771 A1 | 2/2018 |
|----|------------|--------|
| WO | 2016/014234 A1 | 1/2016 |

*Primary Examiner* — Brent D Castiaux
(74) *Attorney, Agent, or Firm* — Fernando & Partners, LLP

(57) ABSTRACT

Various implementations disclosed herein include devices, systems, and methods for presenting content based on environmental data. In various implementations, a device includes a display, a non-transitory memory and one or more processors coupled with the display and the non-transitory memory. In some implementations, a method includes obtaining environmental data associated with a physical environment in which the device is located. In some implementations, the method includes selecting, from a plurality of presentation modes, a first presentation mode for content based on the environmental data. In some implementations, the method includes presenting the content in accordance with the first presentation mode.

25 Claims, 9 Drawing Sheets

(51) Int. Cl.
*G06F 3/01* (2006.01)
*G06T 7/00* (2017.01)
*G02B 27/01* (2006.01)
*G09G 5/36* (2006.01)
*H04R 1/02* (2006.01)
*G10L 25/51* (2013.01)

(56) References Cited

U.S. PATENT DOCUMENTS

| | | | |
|---|---|---|---|
| 2015/0070406 A1* | 3/2015 | Baek | G09G 3/3406 |
| | | | 345/690 |
| 2018/0276898 A1* | 9/2018 | Nishizawa | G06F 3/04812 |
| 2018/0307303 A1 | 10/2018 | Powderly et al. | |
| 2019/0279430 A1 | 9/2019 | Todeschini | |

* cited by examiner

CONTENT PRESENTATION BASED ON ENVIRONMENTAL DATA

CROSS-REFERENCE TO RELATED APPLICATION

This application claims the benefit of U.S. Provisional Patent App. No. 63/000,099, filed on Mar. 26, 2020, which is incorporated by reference in its entirety.

TECHNICAL FIELD

The present disclosure generally relates to content presentation based on environmental data.

BACKGROUND

Some devices are capable of generating and presenting environments that include various objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
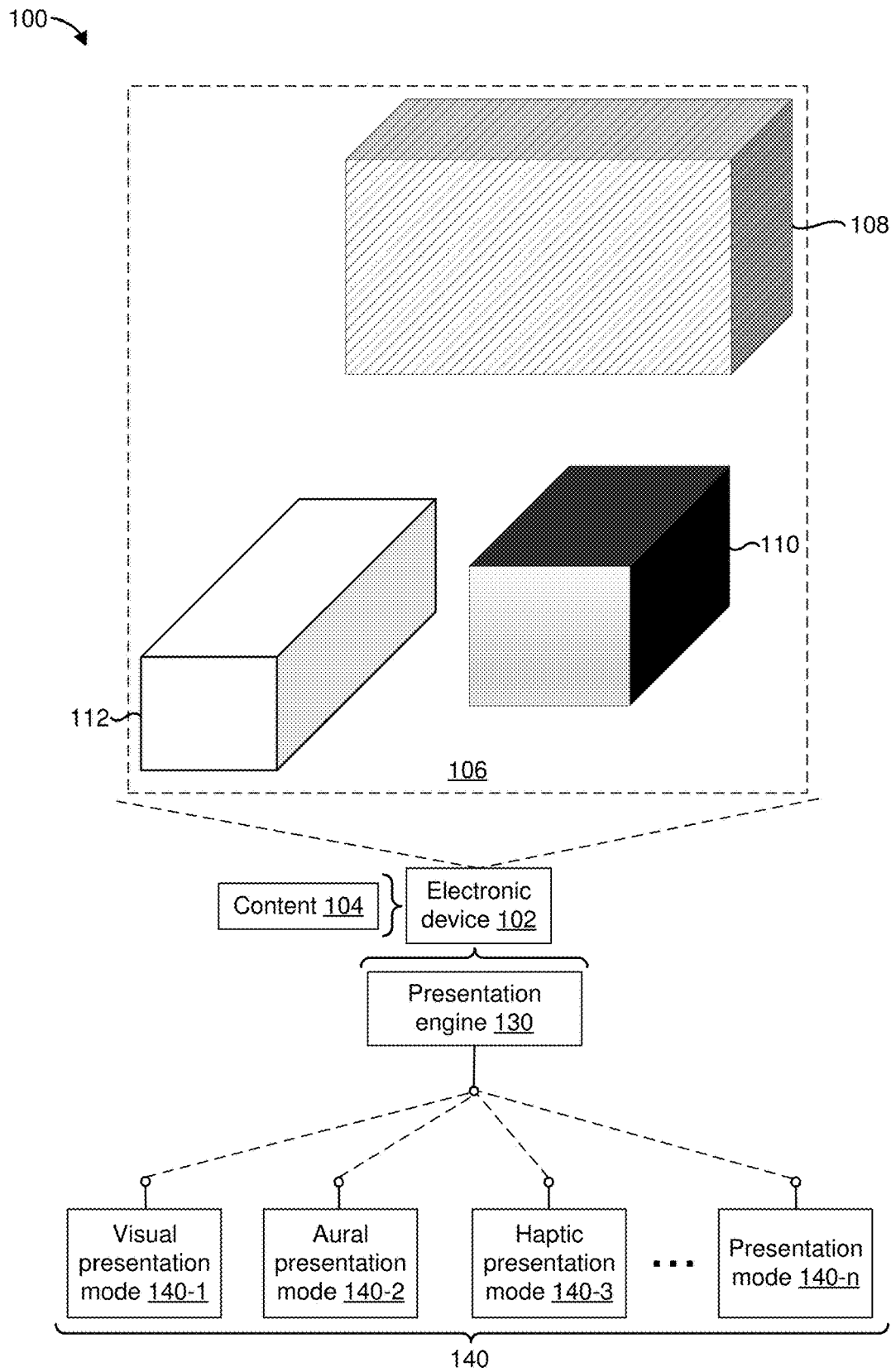
FIGS. 1A-1E are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting content based on environmental data. In various implementations, a device includes a display, a non-transitory memory and one or more processors coupled with the display and the non-transitory memory. In some implementations, a method includes obtaining environmental data associated with a physical environment in which the device is located. In some implementations, the method includes selecting, from a plurality of presentation modes, a first presentation mode for content based on the environmental data. In some implementations, the method includes presenting the content in accordance with the first presentation mode.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Various head-mounted devices (HMDs) include an optical see-through display that is at least partially transparent. Thus, a user wearing the HMD can see through the optical see-through display to view the physical environment in which the user is present.

The optical see-through display includes light-emitting pixels. The light-emitting pixels can be controlled to present an image to the user. However, in various implementations, the light-emitting pixels (and/or spaces between the light-emitting pixels) are at least partially transparent. Thus, the light-emitting pixels do not block light from the physical environment from reaching the eye of the user, but only add light to the light from the physical environment. Thus, in various implementations, the optical see-through display is an additive display.

In various implementations, because the optical see-through display is an additive display, environmental conditions of the physical environment can adversely affect the presentation of the content. For example, if visual content is being displayed on a device with an optical see-through display in a physical environment that is visually noisy, then a user of the device may not be able to properly view the visual content. Similarly, if audio content is being played in a physical environment that is aurally noisy, then the user may not be able to properly listen to the audio content.

The present disclosure provides methods, systems, and/or devices for selecting a presentation mode of content based on environmental conditions of the physical environment. For example, if the physical environment is visually noisy but aurally quiet, then visual content is converted to speech and outputted as audio. Similarly, if the physical environment is aurally noisy but visually quiet, then audio content is converted to text and displayed on the display. Selecting the presentation mode of content based on the environmental conditions enhances a user experience provided by the device by allowing a user to properly sense the content.

FIG. 1A is a diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102. In some implementations, the electronic device 102 includes a handheld computing device that can be held by a user (not shown). For example, in some implementations, the electronic device 102 includes a smartphone, a tablet, a media player, a laptop, or the like. In some implementations, the electronic device 102 includes a wearable computing device that can be worn by the user. For example, in some implementations, the electronic device 102 includes a head-mountable device (HMD), an electronic watch or a pair of headphones.

Figure 4A:
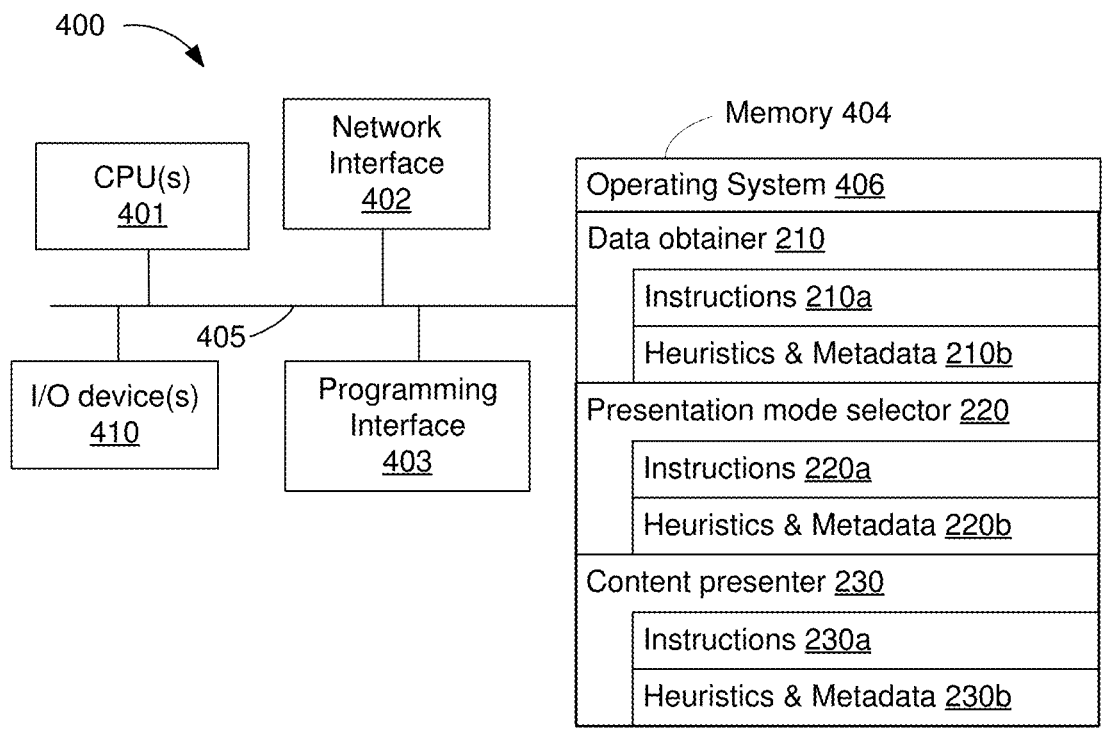
FIG. 4A is a block diagram of a device that presents content in accordance with some implementations.
Figure 4B:
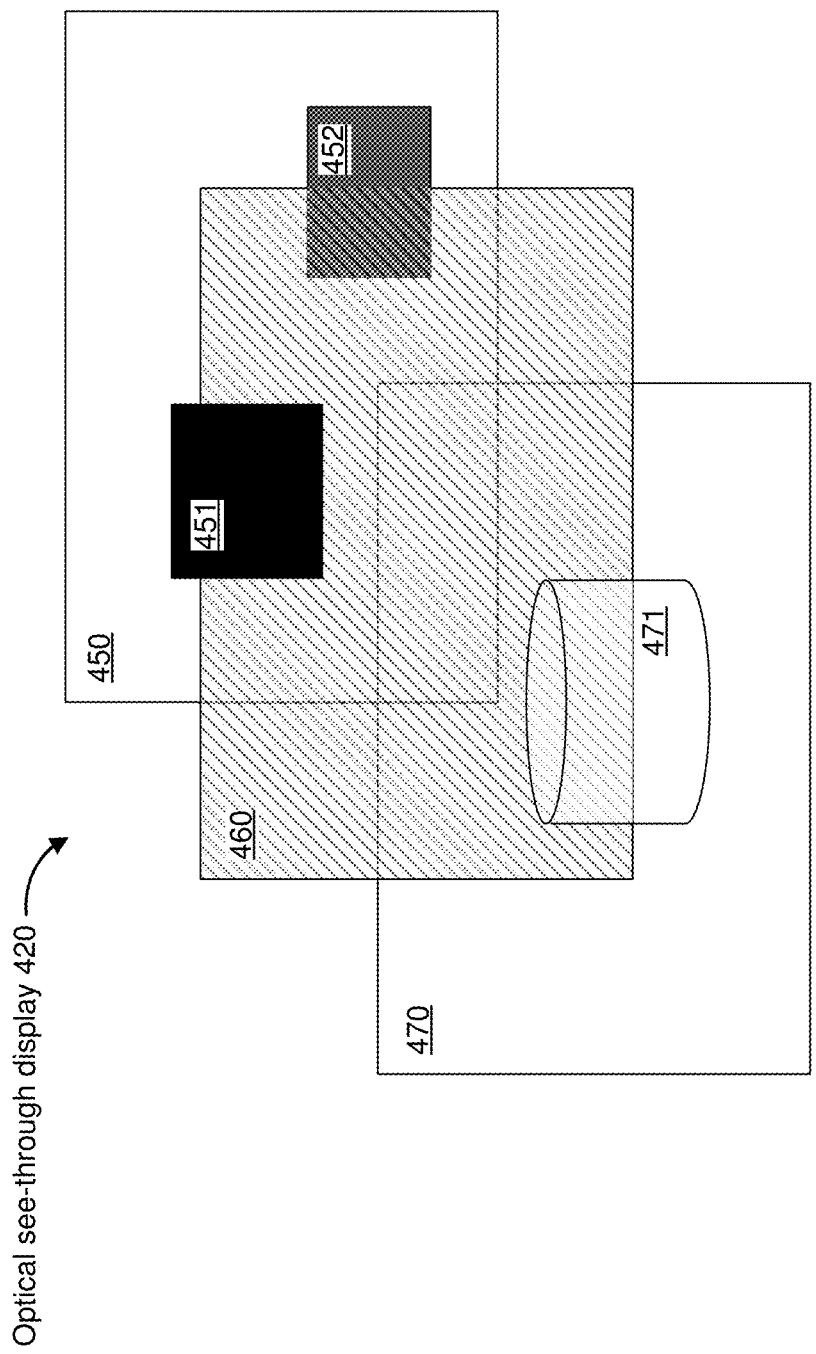
FIG. 4B is a blow-up view of an optical see-through display in accordance with some implementations.

In some implementations, the electronic device 102 includes an optical see-through display (e.g., the optical see-through display 420 shown in FIG. 4B). For example, the electronic device 102 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

In some implementations, the electronic device 102 stores content 104. In some implementations, the content 104 includes XR content (e.g., AR content) that is overlaid onto a pass-through of a physical environment in which the electronic device 102 is located. In some implementations, the content 104 is visual. For example, the content 104 includes an image, a video, a map and/or text. In some implementations, the content 104 is aural. For example, the content 104 includes audio such as an audiobook, a song, a podcast, a navigational command (e.g., turn right), etc. In some implementations, the content 104 includes a set of haptic responses. For example, the content 104 includes a set of vibrations that serve as a notification (e.g., of an incoming phone call, or a received message, etc.).

In some implementations, the electronic device 102 displays an XR environment 106. In some implementations, the XR environment 106 is a pass-through of a physical environment in which the electronic device 102 is located. In some implementations, the electronic device 102 includes an optical see-through display (e.g., an additive display), and the XR environment 106 is an optical pass-through of the physical environment in which the electronic device 102 is located. In some implementations, when the electronic device 102 presents the optical pass-through of the physical environment, light from the physical environment enters the user's eyes. In some implementations, the XR environment 106 is a video pass-through of the physical environment in which the electronic device 102 is located. In some implementations, when the electronic device 102 displays the video pass-through of the physical environment, a camera of the electronic device 102 captures a set of images of the physical environment and a display of the electronic device 102 displays the set of images.

In various implementations, the XR environment 106 includes XR objects that represent physical articles that are in the physical environment of the electronic device 102. In the example of FIG. 1A, the XR environment 106 includes an XR bus 108, an XR dirt bike 110 and an XR motorcycle 112. In some implementations, the XR environment 106 is an optical pass-through of the physical environment of the electronic device 102, and the XR bus 108 is a physical bus, the XR dirt bike 110 is a physical dirt bike and the XR motorcycle 112 is a physical motorcycle. In some implementations, the XR environment 106 is a video pass-through of the physical environment of the electronic device 102, and the XR bus 108 is an XR representation of the physical bus, the XR dirt bike 110 is an XR representation of the physical dirt bike and the XR motorcycle 112 is an XR representation of the physical motorcycle.

In some implementations, the operating environment 100 includes a content presentation engine 130 that selects a particular presentation mode 140 for the content 104 from various presentation modes 140 based on environmental conditions of the physical environment of the electronic device 102. As illustrated in FIG. 1A, in some implementations, the electronic device 102 includes the content presentation engine 130. Alternatively, in some implementations, the content presentation engine 130 is separate from the electronic device 102 (e.g., in some implementations, the content presentation engine 130 resides at a remote server). In some implementations, the presentation modes 140 include a visual presentation mode 140-1, an aural presentation mode 140-2, a haptic presentation mode 140-3, ..., and an nth presentation mode 140-n.

In some implementations, in the visual presentation mode 140-1, the electronic device 102 displays a visual representation of the content 104. In some implementations, the content 104 is visual (e.g., an image, a video or text), and the electronic device 102 displays the content 104 in the visual presentation mode 140-1 without modifying the content 104.

In the visual presentation mode 140-1, when the content 104 is aural (e.g., a navigational instruction such as "turn right", an audiobook, a podcast, a song, etc.), the electronic device 102 generates a visual representation of the content 104 and displays the visual representation of the content 104. For example, the electronic device 102 performs a voice-to-text conversion to generate text that represents the content 104, and displays the generated text on a display of the electronic device 102.

In the visual presentation mode 140-1, when the content 104 is a set of haptic responses (e.g., a vibrational pattern for indicating an alert such as an incoming call, an upcoming turn, etc.), the electronic device 102 generates a visual representation of the content 104 and displays the visual representation of the content 104. For example, the electronic device 102 displays text describing the alert that the set of haptic responses represent. As an example, if the haptic responses represent an alert for indicating an upcoming turn, then the electronic device 102 displays text to indicate the upcoming turn.

In some implementations, in the aural presentation mode 140-2, the electronic device 102 plays an audio representation of the content 104. In some implementations, the content 104 is aural (e.g., a navigational instruction such as "turn right", an audiobook, a podcast, a song, etc.), and the electronic device 102 plays the content 104 without modifying the content 104.

In the aural presentation mode 140-2, when the content 104 is visual (e.g., an image, a video or text), the electronic device 102 generates an audio representation of the content 104 and plays the audio representation of the content 104. For example, if the content 104 is textual, then the electronic device 102 performs a text-to-speech conversion to generate speech that represents the content 104, and outputs the speech via a speaker of the electronic device 102. As another example, if the content 104 is a video, then the electronic device 102 performs a scene-to-speech conversion to generate speech that describes the video, and outputs the speech via the speaker of the electronic device 102.

In the aural presentation mode 140-2, when the content 104 is a set of haptic responses (e.g., a vibrational pattern for indicating an alert such as an incoming call, an upcoming turn, etc.), the electronic device 102 generates audio that corresponds to the set of haptic responses, and outputs the generated audio via a speaker. For example, if the haptic responses represent a type of alert (e.g., an incoming phone call, an upcoming navigational turn, etc.), the electronic device 102 generates audio that describes the type of alert (e.g., "incoming phone call", "right turn coming up", etc.).

In some implementations, the aural presentation mode 140-2 is referred to as an audio presentation mode. In some implementations, in the aural presentation mode 140-2, the electronic device 102 plays audio and forgoes displaying visual content. In such implementations, the aural presentation mode 140-2 is sometimes referred to as an audio-only mode or a listen-only mode.

In some implementations, in the haptic presentation mode 140-3, the electronic device 102 provides a set of haptic responses that correspond to the content 104. In some implementations, the content 104 is a set of haptic responses, and the electronic device 102 outputs the set of haptic responses without modifying the content 104.

In the haptic presentation mode 140-3, when the content 104 is visual or aural, the electronic device 102 generates a set of haptic responses that represent the content 104 and outputs the set of haptic responses. In some implementations, the electronic device 102 converts the content 104 into the set of haptic responses. As an example, the electronic device 102 converts an audio instruction to "turn right" into two successive quick vibrations, the electronic device 102 converts an audio instruction to "turn left" into three successive quick vibrations, and the electronic device 102 converts an audio instruction to "stop" into a long single vibration.

Figure 1B:
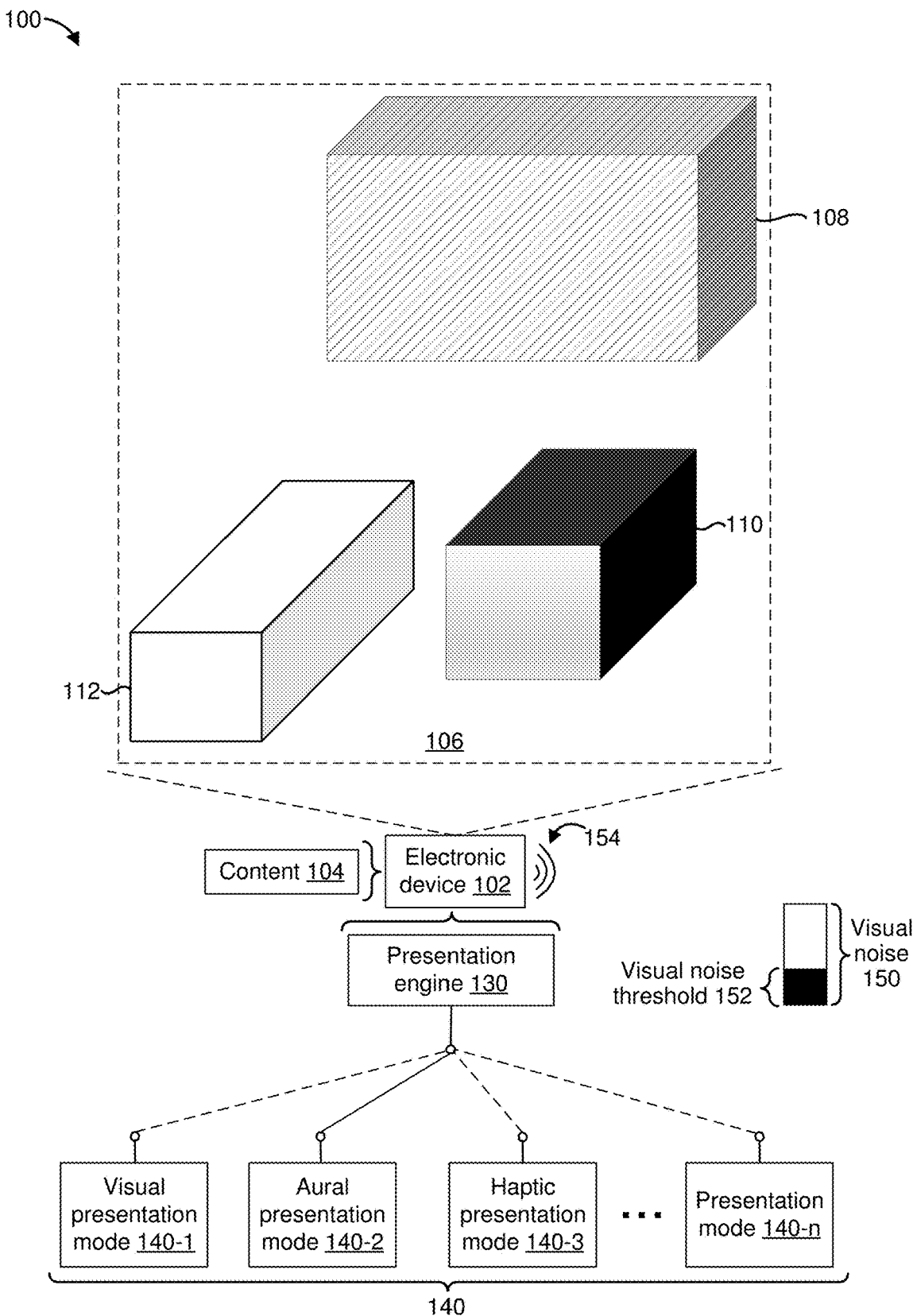

Referring to FIG. 1B, the electronic device 102 (e.g., the content presentation engine 130) determines that a visual noise 150 in the physical environment is greater than a visual noise threshold 152. Since the visual noise 150 is greater than the visual noise threshold 152, presenting the content 104 in the visual presentation mode 140-1 may make it difficult for the user of the electronic device 102 to view the content 104. As such, the content presentation engine 130 selects the aural presentation mode 140-2 for presenting the content 104. Since the content presentation engine 130 has selected the aural presentation mode 140-2 for presenting the content 104, the electronic device 102 outputs audio 154 corresponding to the content 104. In some implementations, the audio 154 is an aural representation of the content 104.

In some implementations, the content 104 is textual. For example, the content 104 is a visual notification, an ebook, a web article, etc. In such implementations, the electronic device 102 generates the audio 154 by performing a text-to-speech operation on the content 104, and outputting the generated speech as the audio 154.

In some implementations, the content 104 is a video or an image. In such implementations, the electronic device 102 generates a description of the video or the image and outputs the description as the audio 154. In some implementations, the electronic device 102 generates the description of the video or the image by performing scene analysis on the video or the image.

Figure 1C:
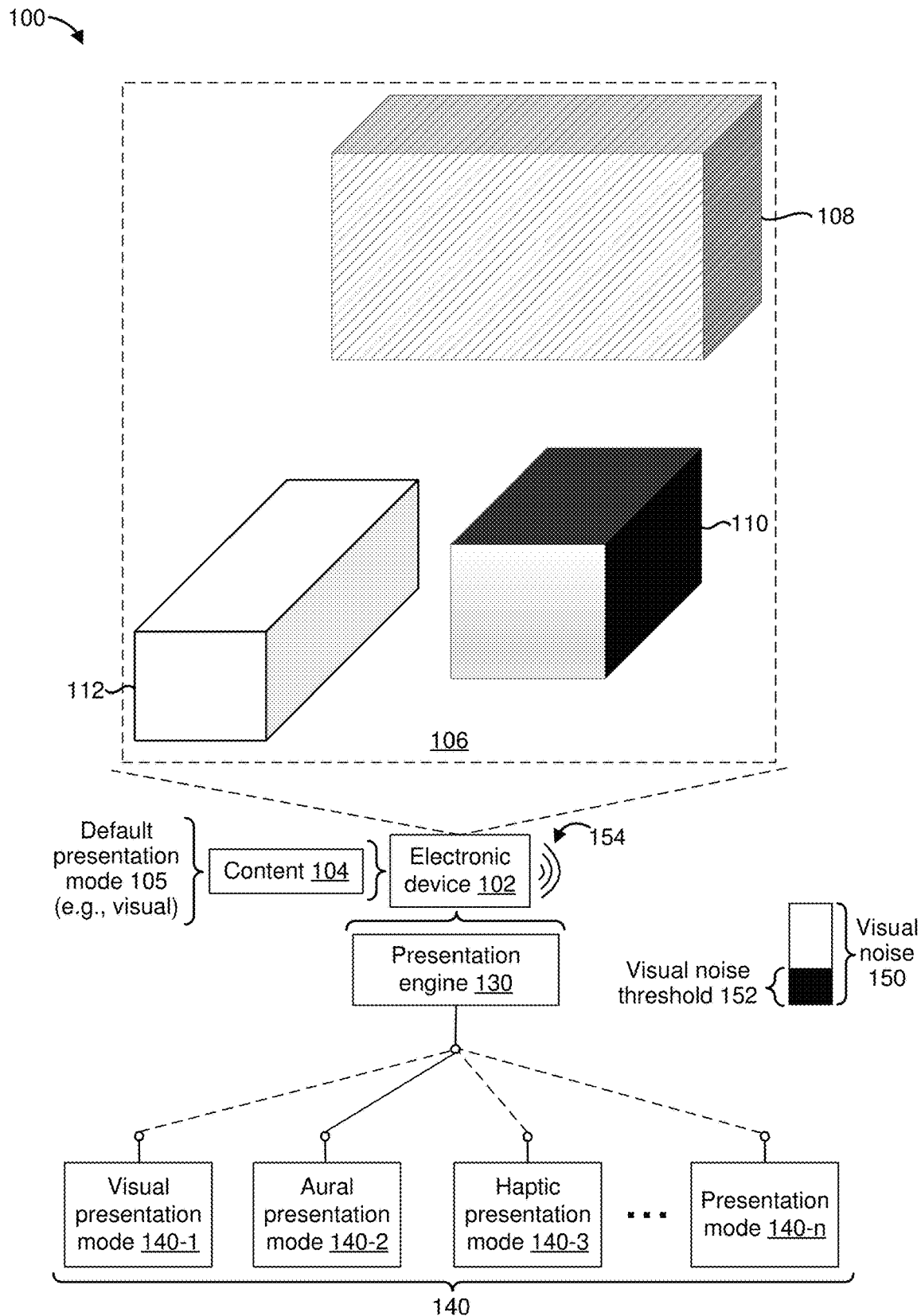

Referring to FIG. 1C, in some implementations, the content 104 is associated with a default presentation mode 105. In the example of FIG. 1C, the default presentation mode 105 of the content 104 is the visual presentation mode 140-1. Since the visual noise 150 is greater than the visual noise threshold 152, the electronic device 102 forgoes presenting the content 104 in its default presentation mode 105 and presents the content 104 in the aural presentation mode 140-2.

In some implementations, the visual noise 150 indicates a number of XR objects that are in the XR environment 106, and the visual noise threshold 152 corresponds to a threshold number. If the number of XR objects in the XR environment 106 exceeds the threshold number indicated by the visual noise threshold 152, then presenting the content 104 in the visual presentation mode 140-1 may be ineffective because the user may not be able to property see the visual representation of the content 104. As such, if the number of XR objects exceeds the threshold number, the electronic device 102 selects a presentation mode 140 that is different from the visual presentation mode 140-1 (e.g., the electronic device 102 selects the aural presentation mode 140-2).

In some implementations, the visual noise 150 indicates a percentage of the XR environment 106 that is occupied by XR objects, and the visual noise threshold 152 corresponds to a threshold percentage. If the percentage of the XR environment 106 occupied by the XR objects exceeds the threshold percentage indicated by the visual noise threshold 152, then presenting the content 104 in the visual presentation mode 140-1 may be ineffective because the user may not be able to properly view the visual representation of the content 104. As such, if the percentage of the XR environment 106 occupied by the XR objects exceeds the threshold percentage, the electronic device 102 selects a presentation mode 140 that is different from the visual presentation mode 140-1 (e.g., the electronic device 102 selects the aural presentation mode 140-2).

In some implementations, the visual noise 150 indicates an amount of ambient light in the physical environment surrounding the electronic device 102, and the visual noise threshold 152 corresponds to an ambient light threshold. If the amount of ambient light in the physical environment exceeds the ambient light threshold, then presenting the content 104 in the visual presentation mode 140-1 may be ineffective because the user may not be able to properly view the visual representation of the content 104. As such, if the amount of ambient light in the physical environment exceeds the ambient light threshold, the electronic device 102 selects a presentation mode 140 that is different from the visual presentation mode 140-1 (e.g., the electronic device selects the aural presentation mode 140-2).

In some implementations, the visual noise threshold 152 is a function of a type of display of the electronic device 102. For example, if the electronic device 102 includes an opaque display, then the visual noise threshold 152 is set to a first value. However, if the electronic device 102 includes an optical see-through display (e.g., an additive display), then the visual noise threshold 152 is set to a second value that is lower than the first value. Optical see-through displays tend to be more susceptible to visual noise due to their display characteristics than opaque displays. As such, setting the visual noise threshold 152 to a lower value for optical see-through displays tends to cause the electronic device 102 to select a presentation mode 140 that is different from the visual presentation mode 140-1 at lower values of the visual noise 150 thereby enhancing a user experience provided by the electronic device 102 when the electronic device 102 includes an optical see-through display.

In some implementations, the visual noise threshold 152 is a function of display characteristics of the content 104. In some implementations, the visual noise threshold 152 is a function of a brightness of the content 104. For example, if the brightness of the content 104 is lower than a threshold brightness, then the visual noise threshold 152 is set to a first value. However, if the brightness of the content 104 is higher than the threshold brightness, then the visual noise threshold 152 is set to a second value that is greater than the first value. Dull content tends to be more susceptible to visual noise than bright content. Hence, lowering the value of the visual noise threshold 152 for dull content tends to cause the electronic device 102 to select a presentation mode 140 that is different from the visual presentation mode 140-1 at lower values of the visual noise 150 thereby enhancing a user experience provided by the electronic device 102 when the content 104 includes dull content.

In some implementations, the visual noise threshold 152 is a function of colors utilized in the content 104. For example, if the content 104 utilizes a first set of colors (e.g., light colors, for example, yellow, cyan, etc.) that tend to be more susceptible to visual noise, then the visual noise threshold 152 is set to a first value. However, if the content 104 utilizes a second set of colors (e.g., dark colors, for example, black, navy blue, dark green, etc.) that tend to be less susceptible to visual noise, then the visual noise threshold 152 is set to a second value that is greater than the first value. Light colors tend to be more susceptible to visual noise than dark colors. Hence, lowering the value of the visual noise threshold 152 for light colors tends to cause the electronic device 102 to select a presentation mode 140 that is different from the visual presentation mode 140-1 at lower values of the visual noise 150 thereby enhancing a user experience provided by the electronic device 102 when the content 104 utilizes light colors.

In some implementations, the visual noise 150 represents an amount of similarity between the display characteristics of the content 104 and the optical characteristics of the physical environment. For example, in some implementations, the visual noise 150 represents an amount of similarity between colors utilized in the content 104 and colors of the physical articles in the physical environment. In some implementations, the visual noise threshold 152 represents a threshold similarity. If the amount of similarity represented by the visual noise 150 exceeds the threshold similarity represented by the visual noise threshold 152, then displaying the content 104 in the visual presentation mode 140-1 may be ineffective because the user may not be able to distinguish between the visual representation of the content 104 and the physical articles. As such, the electronic device 102 forgoes presenting the content 104 in the visual presentation mode 140-1 and presents the content 104 in a presentation mode 140 that is different from the visual presentation mode 140-1 (e.g., the aural presentation mode 140-2) when the amount of similarity between the display characteristics of the content 104 and the optical characteristics of the physical environment exceeds the similarity threshold indicated by the visual noise threshold 152.

In some implementations, the visual noise 150 represents an amount of optical variation in a background of the XR environment 106. For example, the visual noise 150 represents an amount of color variation or an amount of texture variation in the background of the XR environment 106. In some implementations, the visual noise threshold 152 represents a threshold amount of optical variation. For example, the visual noise threshold 152 represents a threshold amount of color variation or a threshold amount of texture variation. As an example, the visual noise 150 is lower than the visual noise threshold 152 when the background of the XR environment 106 includes a flat single color surface. As another example, the visual noise 150 is greater than the visual noise threshold 152 when the background of the XR environment 106 includes a brick wall with numerous lines and a rough texture.

Figure 1D:
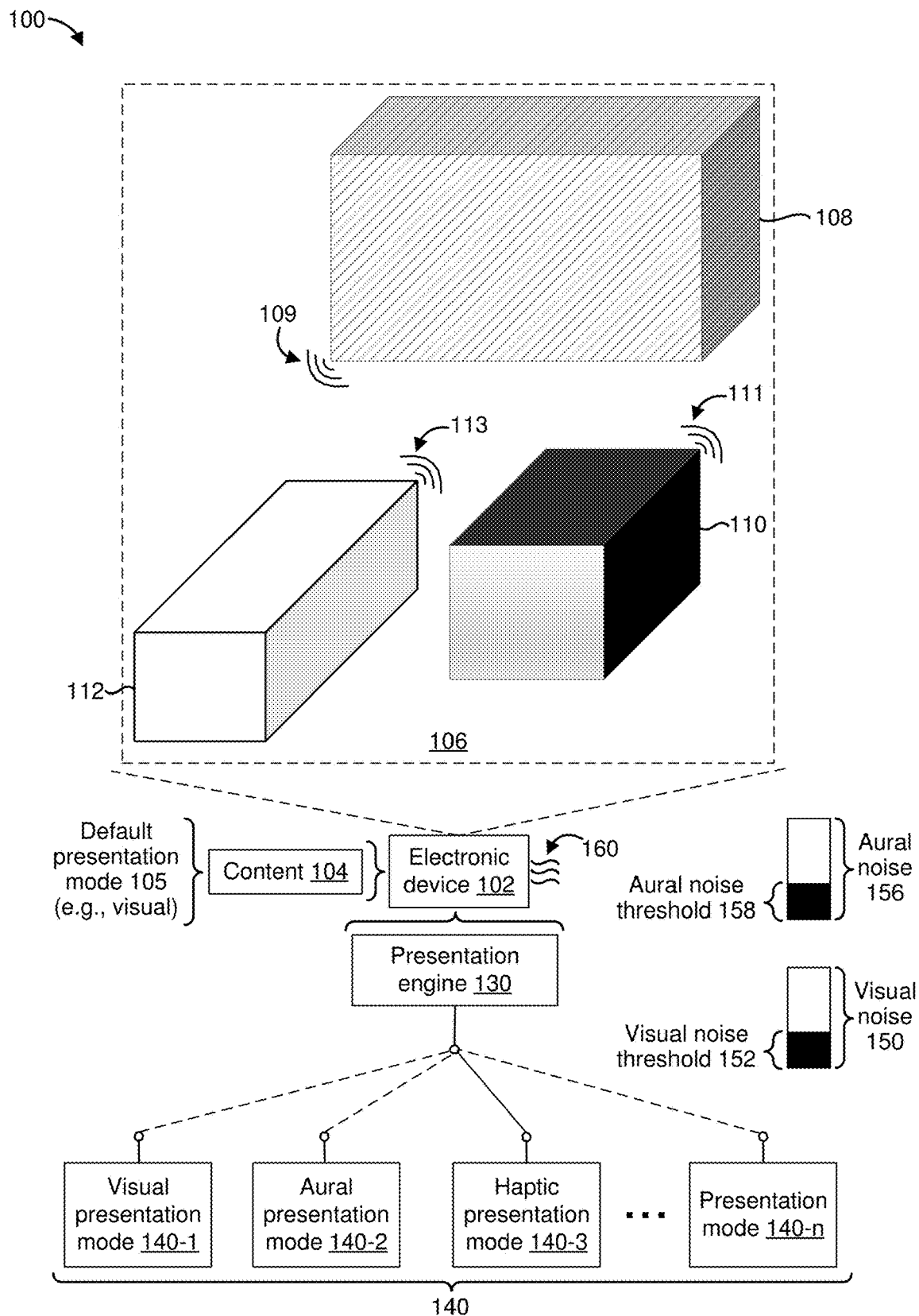

Referring to FIG. 1D, the electronic device 102 (e.g., the content presentation engine 130) determines that an aural noise 156 in the physical environment is greater than an aural noise threshold 158. In some implementations, the aural noise 156 is a combination of sound 109 from the physical bus, sound 111 from the physical dirt bike and sound 113 from the physical motorcycle. Since the aural noise 156 is greater than the aural noise threshold 158, presenting the content 104 in the aural presentation mode 140-2 may be ineffective because the user may not be able to hear an audio representation of the content 104. As such, the content presentation engine 130 selects the haptic presentation mode 140-3 for presenting the content 104. Since the content presentation engine 130 has selected the haptic presentation mode 140-3 for presenting the content 104, the electronic device 102 outputs haptic responses 160 corresponding to the content 104.

In some implementations, the electronic device 102 generates the haptic responses 160 by utilizing a set of conversion rules for converting visual or aural content into haptic responses. For example, if the content 104 includes a navigational instruction to turn right then the haptic responses 160 include two successive short vibrations, if the content 104 includes a navigational instruction to turn left then the haptic responses 160 include three successive short vibrations, and if the content 104 includes navigational instruction to stop then the haptic responses 160 include a single long vibration.

Figure 1E:
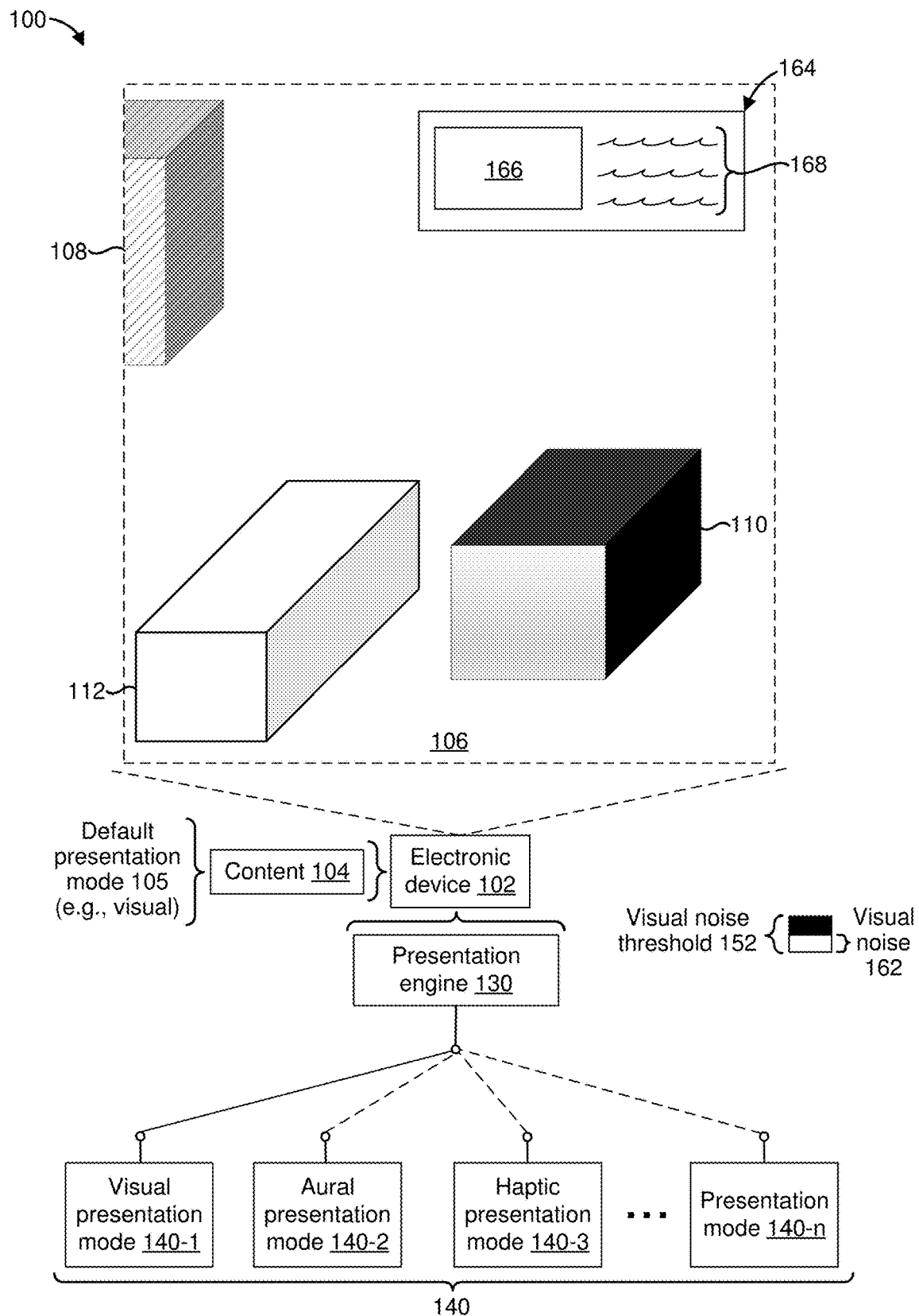

Referring to FIG. 1E, in various implementations, the electronic device 102 switches the presentation mode 140 of the content 104 as the environmental conditions of the physical environment change. In the example of FIG. 1E, a visual noise 162 below the visual noise threshold 152 triggers the content presentation engine 130 to switch the presentation of the content 104 from the aural presentation mode 140-2 or the haptic presentation mode 140-3 to the visual presentation mode 140-1. As such, the electronic device 102 displays a visual representation 164 of the content 104. In some implementations, the visual representation 164 includes an image 166 and/or text 168.

In some implementations, the electronic device 102 includes an HMD that is worn by a user (not shown). In some implementations, the HMD presents (e.g., displays) the XR environment 106 according to various implementations. In some implementations, the HMD includes an integrated display (e.g., a built-in display, for example, a built-in optical see-through display or a built-in opaque display) that displays the XR environment 106. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the XR environment 106. In various implementations, examples of the electronic device 102 include smartphones, tablets, media players, laptops, etc.

Figure 2:
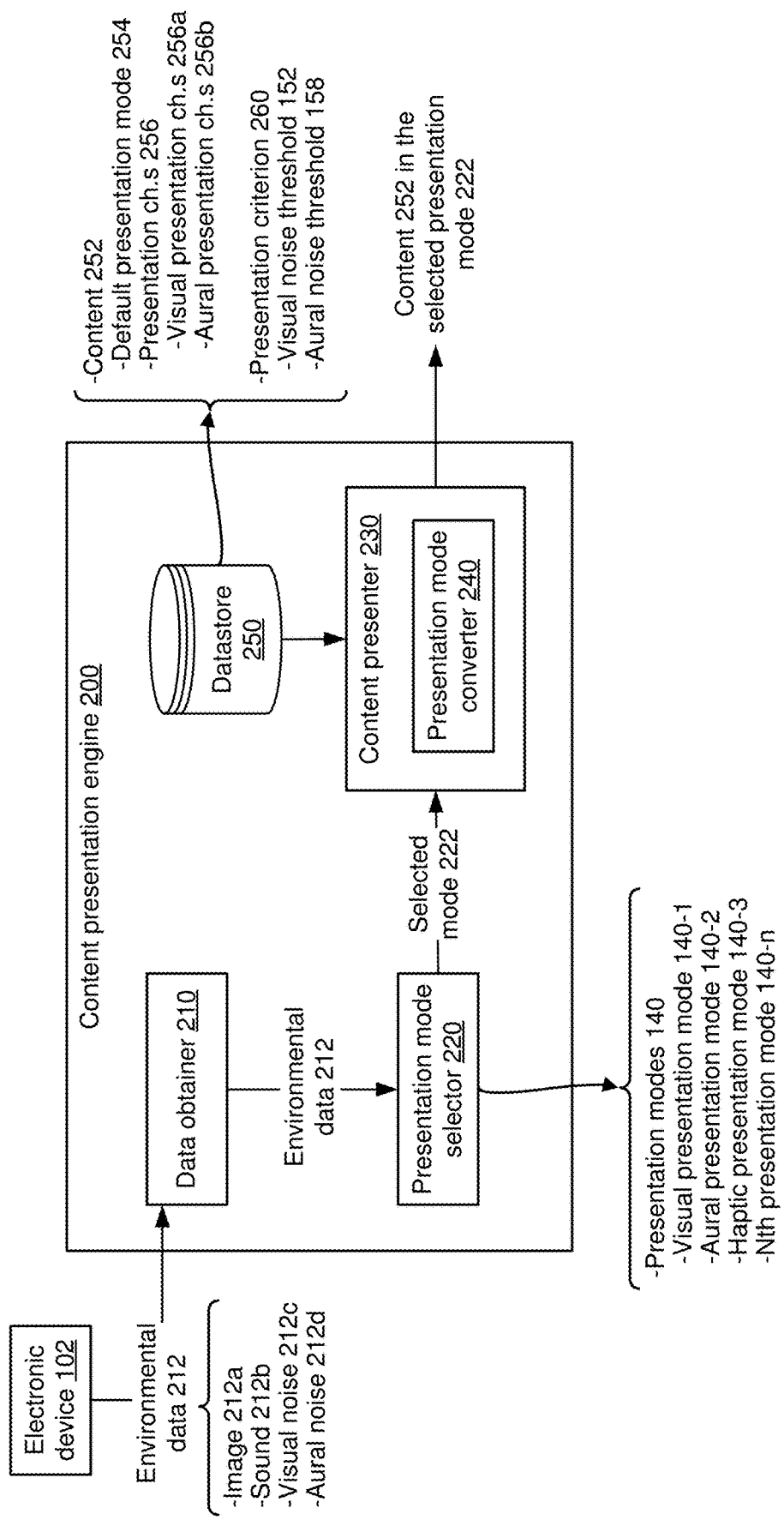
FIG. 2 is a block diagram of a content presentation engine in accordance with some implementations.

FIG. 2 is a block diagram of a content presentation engine 200 in accordance with some implementations. In some implementations, the content presentation engine 200 implements the content presentation engine 130 shown in FIGS. 1A-1E. In some implementations, the electronic device 102 includes the content presentation engine 200. Alternatively, in some implementations, the content presentation engine 200 is separate from the electronic device 102. In various implementations, the content presentation engine 200 includes a data obtainer 210, a presentation mode selector 220, a content presenter 230, a presentation mode converter 240 and a datastore 250.

In various implementations, the datastore 250 stores content 252 (e.g., the content 104 shown in FIGS. 1A-1E). In some implementations, the content 252 is associated with a default presentation mode 254 that is based on a type of the content 252. For example, in some implementations, the default presentation mode 254 of the content 252 is the visual presentation mode 140-1 (e.g., when the content 252 is visual such as a video, an image or text). In some implementations, the content 252 is associated with one or more presentation characteristics 256. In some implementations, the presentation characteristics 256 define how the content 252 is to be presented in the default presentation mode 254.

In some implementations, the presentation characteristics 256 include visual presentation characteristics 256a. In some implementations, the visual presentation characteristics 256a indicate colors that the content 252 utilizes. For example, the visual presentation characteristics 256a indicate whether the content 252 utilizes light colors or dark colors. In some implementations, the visual presentation characteristics 256a indicate a brightness of the content 252.

In some implementations, the presentation characteristics 256 include aural presentation characteristics 256b. In some implementations, the aural presentation characteristics 256b indicate a loudness of sounds in the content 252. For example, the aural presentation characteristics 256b indicate amplitudes of sounds in the content 252. In some implementations, the aural presentation characteristics 256b indicate frequencies of the sounds in the content 252.

In some implementations, the datastore 250 stores a presentation criterion 260 for the content 252. In some implementations, the presentation criterion 260 is a function of the content 252. In some implementations, the presentation criterion 260 includes the visual noise threshold 152. In some implementations, the visual noise threshold 152 is a function of the visual presentation characteristics 256a of the content 252. For example, the visual noise threshold 152 specifies an ambient light threshold that is less than a brightness of the content 252 indicated by the visual presentation characteristics 256a (e.g., in order to forgo presenting the content 252 in the visual presentation mode 140-1 when the physical environment is brighter than the content 252).

In some implementations, the presentation criterion 260 includes the aural noise threshold 158. In some implementations, the aural noise threshold 158 is a function of the aural presentation characteristics 256b of the content 252. For example, the aural noise threshold 158 specifies an ambient sound threshold that is less than an average amplitude of sounds in the content 252 indicated by the aural presentation characteristics 256b (e.g., in order to forgo presenting the content 252 in the aural presentation mode 140-2 when the physical environment is louder than the sounds in the content 252).

In various implementations, the data obtainer 210 obtains environmental data associated with a physical environment. For example, in some implementations, the data obtainer 210 obtains environmental data that indicates environmental conditions of the physical environment surrounding the electronic device 102. In some implementations, the electronic device 102 includes a set of one or more environmental sensors (e.g., an image sensor such as a camera, a depth sensor such as a depth camera, an ambient light sensor, a microphone, etc.) that capture the environmental data 212, and the data obtainer 210 receives the environmental data 212 from the electronic device 102. In some implementations, the environmental data 212 includes an image 212a. For example, the electronic device 102 captures the image 212a via a camera of the electronic device 102. In some implementations, the environmental data 212 includes sound 212b. For example, the electronic device 102 records sound via a microphone of the electronic device 102.

In some implementations, the environmental data 212 indicates a visual noise 212c in the physical environment surrounding the electronic device 102. In some implementations, the content presentation engine 200 (e.g., the data obtainer 210 or the presentation mode selector 220) determines the visual noise 212c based on the image 212a (e.g., by performing an image analysis of the image 212a). In some implementations, the visual noise 212c indicates an amount of ambient light in the physical environment surrounding the electronic device 102. In some implementations, the visual noise 212c indicates a number of physical articles in the physical environment. In some implementations, the visual noise 212c indicates a percentage of a field-of-view of the electronic device 102 that is occupied by physical articles in the physical environment.

In some implementations, the environmental data 212 indicates an aural noise 212d in the physical environment surrounding the electronic device 102. In some implementations, the content presentation engine 200 (e.g., the data obtainer 210 or the presentation mode selector 220) determines the aural noise 212d based on the sound 212b (e.g., by performing a sound analysis of the sound 212b). In some implementations, the aural noise 212d indicates an amount of ambient sound in the physical environment surrounding the electronic device 102.

In various implementations, the presentation mode selector 220 selects one of the presentation modes 140 for presenting the content 252 on the electronic device 102 based on the environmental data 212. In some implementations, the presentation mode selector 220 determines whether or not the environmental data 212 satisfies the presentation criterion 260. In some implementations, the presentation mode selector 220 selects the visual presentation mode 140-1 when the visual noise 212c satisfies the visual noise threshold 152 (e.g., when the visual noise 212c is less than the visual noise threshold 152).

In some implementations, the presentation mode selector 220 forgoes selecting the visual presentation mode 140-1 when the visual noise 212c breaches the visual noise threshold 152 (e.g., when the visual noise 212c exceeds the visual noise threshold 152). In such implementations, the presentation mode selector 220 determines whether or not the aural noise 212d satisfies the aural noise threshold 158. If the aural noise 212d satisfies the aural noise threshold 158 (e.g., if the aural noise 212d is less than the aural noise threshold 158), then the presentation mode selector 220 selects the aural presentation mode 140-2 for presenting the content 252.

In some implementations, the presentation mode selector 220 forgoes selecting the aural presentation mode 140-2 when the aural noise 212d breaches the aural noise threshold 158 (e.g., when the aural noise 212d exceeds the aural noise threshold 158). In such implementations, the presentation mode selector 220 determines whether or not a haptic noise threshold satisfies a haptic noise threshold. For example, the presentation mode selector 220 determines whether or not the user will be able to sense vibrations provided by the electronic device 102. If the haptic noise threshold satisfies the haptic noise threshold (e.g., if the presentation mode selector 220 determines that the user will be able to sense vibrations provided by the electronic device 102), then the presentation mode selector 220 selects the haptic presentation mode 140-3 for the presenting the content 252.

In various implementations, the presentation mode selector 220 provides an indication of the selected presentation mode 222 to the content presenter 230. In various implementations, the content presenter 230 presents the content 252 in the selected presentation mode 222. In some implementations, the selected presentation mode 222 of the content 252 is the same as the default presentation mode 254 of the content 252. In such implementations, the content presenter 230 presents the content 252 in its default presentation mode 254 without modifying the content 252 (e.g., without converting the content 252 to another presentation mode.

In some implementations, the selected presentation mode 222 is different from the default presentation mode 254 of the content 252. In such implementations, the presentation mode converter 240 converts the content 252 from its default presentation mode 254 to the selected presentation mode 222. For example, if the default presentation mode 254 is the visual presentation mode 140-1 and the selected presentation mode 222 is the aural presentation mode 140-2, then the presentation mode converter 240 converts the content 252 into audio. For example, if the content 252 includes text, the presentation mode converter 240 performs a text-to-speech conversion and outputs the generated speech. As another example, if the content 252 includes video, the presentation mode converter 240 performs scene analysis and outputs an audio description of the scene.

As another example, if the default presentation mode 254 is the aural presentation mode 140-2 and the selected presentation mode 222 is the visual presentation mode 140-1, the presentation mode converter 240 converts audio from the content 252 into a visual (e.g., text, an image or a video). As another example, if the default presentation mode 254 is the visual presentation mode 140-1 or the aural presentation mode 140-2, and the selected presentation mode 222 is the haptic presentation mode 140-3, the presentation mode converter 240 generates haptic responses based on the information provided by the content 252. As another example, if the default presentation mode 254 is the haptic presentation mode 140-3 and the selected presentation mode 222 is the visual presentation mode 140-1 or the aural presentation mode 140-2, the presentation mode converter 240 generates a visual representation or an aural representation of haptic responses encoded in the content 252.

Figure 3:
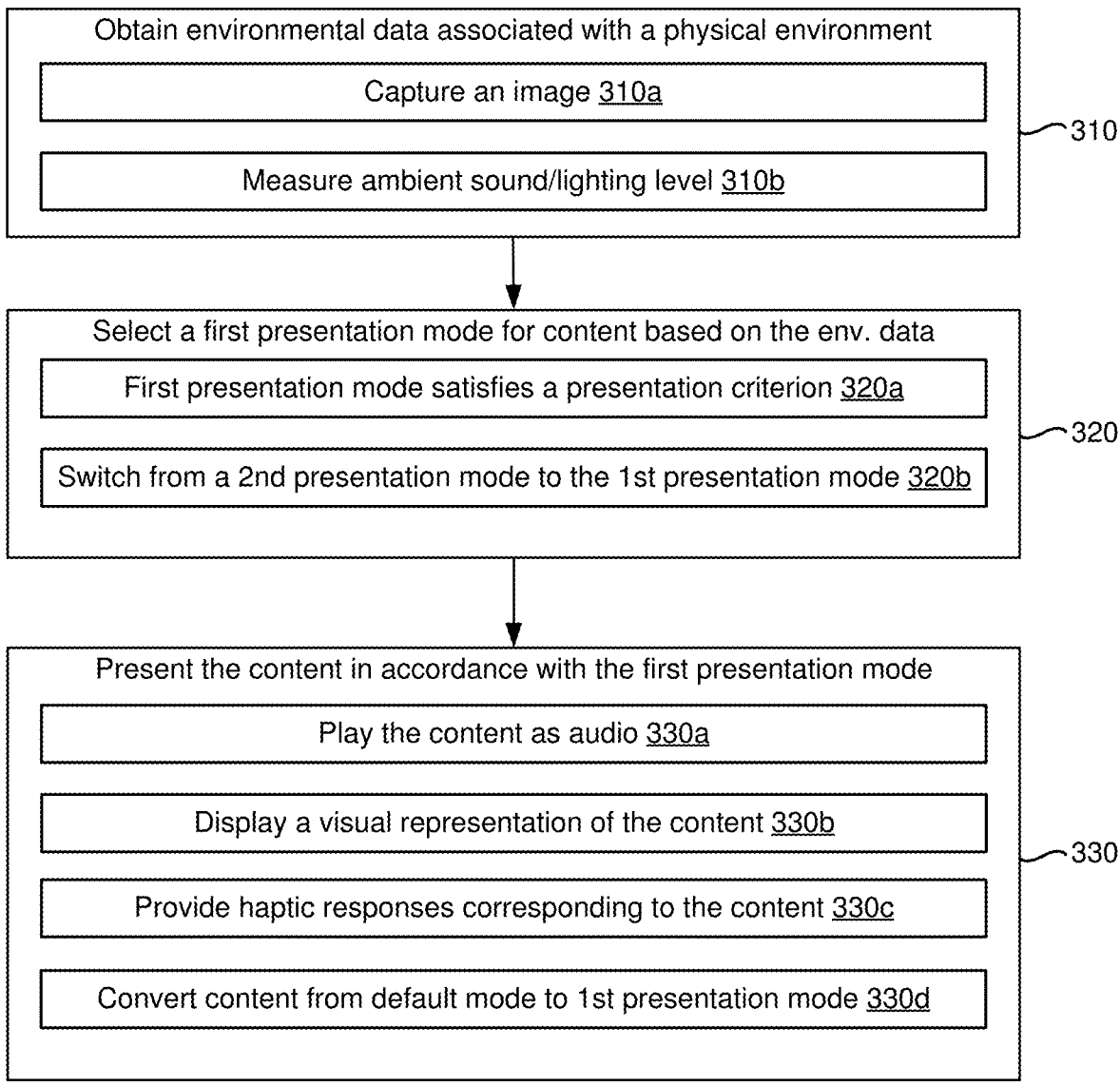
FIG. 3 is a flowchart representation of a method of presenting content in accordance with some implementations.

FIG. 3 is a flowchart representation of a method 300 of presenting content based on environmental data. In various implementations, the method 300 is performed by a device with a display (e.g., an optical see-through display, for example, the optical see-through display 420 shown in FIG.

4B), a non-transitory memory and one or more processors coupled with the display and the non-transitory memory (e.g., the electronic device 102 shown in FIGS. 1A-2, the content presentation engine 130 shown in FIGS. 1A-1E, and/or the content presentation engine 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining environmental data associated with a physical environment in which the device is located. For example, as shown in FIG. 2, the data obtainer 210 obtains the environmental data 212 that indicates an environmental condition of the physical environment surrounding the electronic device 102.

As represented by block 310a, in some implementations, obtaining the environmental data includes capturing an image of the physical environment. For example, as shown in FIG. 2, in some implementations, the environmental data 212 includes the image 212a of the physical environment surrounding the electronic device 102. In some implementations, the electronic device 102 captures the image 212a via a camera of the electronic device 102.

As represented by block 310b, in some implementations, obtaining the environmental data includes measuring an amount of ambient light in the physical environment. As discussed in relation to FIG. 2, in some implementations, the visual noise 212c indicates an amount of ambient light in the physical environment surrounding the electronic device 102.

In some implementations, obtaining the environmental data comprises measuring an amount of ambient noise in the physical environment. As discussed in relation to FIG. 2, in some implementations, the aural noise 212d indicates an amount of ambient noise in the physical environment surrounding the electronic device 102.

As represented by block 320, in some implementations, the method 300 includes selecting, from a plurality of presentation modes, a first presentation mode for content based on the environmental data. For example, as discussed in relation to FIG. 2, in some implementations, the content presentation engine 200 (e.g., the presentation mode selector 220) selects the selected presentation mode 222 from the presentation modes 140 based on the environmental data 212.

As represented by block 320a, in some implementations, the method 300 includes determining, based on the environmental data, that the first presentation mode satisfies a presentation criterion. For example, as described in relation to FIG. 2, in some implementations, the selected presentation mode 222 satisfies the presentation criterion 260.

In some implementations, the presentation criterion is associated with the content. In some implementations, the presentation criterion is a function of the content. For example, as discussed in relation to FIG. 2, in some implementations, the presentation criterion 260 is a function of the presentation characteristics 256 of the content 252. For example, the visual noise threshold 152 is set to a value that is lower than a brightness of the content 252 indicated by the visual presentation characteristics 256a. In another example, the aural noise threshold 158 is set of a value that is lower than an amplitude of sounds in the content 252 indicated by the aural presentation characteristics 256b.

In some implementations, the presentation criterion specifies that a difference in a first color associated with the physical environment and a second color associated with the content exceeds a threshold. As discussed herein, if the color of the content matches the color of the physical environment, then displaying the content may be ineffective because the user may not be able to view the content.

As represented by block 320b, in some implementations, the method 300 includes switching to the first presentation mode from a second presentation mode of the plurality of presentation modes in response to the second presentation mode breaching a presentation criterion. For example, in some implementations, the content presentation engine 130 switches from the visual presentation mode 140-1 to the aural presentation mode 140-2 when the environmental data 212 indicates that the visual noise 212c is greater than the visual noise threshold 152 (shown in FIG. 2).

In some implementations, the method 300 includes switching from displaying a visual representation of the content to outputting an audio representation of the content in response to the environmental data indicating an amount of visual noise that breaches a visual noise threshold. For example, as shown in FIG. 1B, the electronic device 102 outputs audio corresponding to the content 104 when the visual noise 150 is greater than the visual noise threshold 152.

In some implementations, the method 300 includes switching from outputting an audio representation of the content to displaying a visual representation of the content in response to the environmental data indicating an amount of aural noise that breaches an aural noise threshold. For example, in some implementations, the content presentation engine 200 (e.g., the presentation mode selector 220) switches to the visual presentation mode 140-1 from the aural presentation mode 140-2 when the aural noise 212d in the physical environment exceeds the aural noise threshold 158. For example, as shown in FIG. 1E, the content presentation engine 130 switches to the visual presentation mode 140-1 when the visual noise 162 is below the visual noise threshold 152, and the electronic device 102 displays the visual representation 164 of the content 104.

In some implementations, the method 300 includes switching from displaying a visual representation of the content or outputting an audio representation of the content to providing haptic responses that represent the content in response to the environmental data indicating an amount of visual noise that breaches a visual noise threshold and an amount of aural noise that breaches an aural noise threshold. For example, as shown in FIG. 1D, in some implementations, content presentation engine 130 selects the haptic presentation mode 140-3 when the visual noise 150 is greater than the visual noise threshold 152 and the aural noise 156 is greater than the aural noise threshold 158, and the electronic device 102 outputs the haptic responses 160 in the haptic presentation mode 140-3.

As represented by block 330, in some implementations, the method 300 includes presenting the content in accordance with the first presentation mode. As represented by block 330a, in some implementations, the method 300 includes playing the content as audio on a speaker coupled with the device. For example, as shown in FIG. 1B, the electronic device 102 outputs the audio 154 corresponding to the content 104 in the aural presentation mode 140-2. In some implementations, the method 300 includes selecting an aural presentation mode in response to determining that an amount of visual noise breaches a visual noise threshold. For example, as shown in FIG. 1B, the content presentation engine 130 selects the aural presentation mode 140-2 in response to the visual noise 150 exceeding the visual noise threshold 152.

In some implementations, the method 300 includes selecting an aural presentation mode in response to determining that an amount of ambient light breaches an ambient lighting threshold. For example, as discussed in relation to FIG. 2, in some implementations, the presentation mode selector 220 selects the aural presentation mode 140-2 in response to an ambient light measurement indicated by the visual noise 212c exceeding an ambient lighting threshold indicated by the visual noise threshold 152.

In some implementations, the method 300 includes selecting an aural presentation mode in response to determining that a color value of pixels where the content is to be displayed matches a color of the content. For example, as discussed in relation to FIG. 2, in some implementations, the presentation mode selector 220 selects the aural presentation mode 140-2 in response to a color of the content 252 indicated by the visual presentation characteristics 256a matching a color of a portion of the physical environment onto which the content 252 is to be overlaid.

As represented by block 330b, in some implementations, the method 300 includes displaying the content on a display coupled with the device. For example, as shown in FIG. 1E, the electronic device 102 displays the visual representation 164 of the content 104 in the XR environment 106. In some implementations, the method 300 includes selecting a visual presentation mode in response to determining that an amount of aural noise breaches an aural noise threshold. For example, in some implementations, the content presentation engine 200 (e.g., the presentation mode selector 220) selects the visual presentation mode 140-1 in response to the aural noise 212d exceeding the aural noise threshold 158. In some implementations, the method 300 includes selecting a visual presentation mode in response to determining that an amount of ambient noise breaches an ambient noise threshold. For example, in some implementations, the content presentation engine 200 (e.g., the presentation mode selector 220) selects the visual presentation mode 140-1 in response to an amount of ambient noise indicated by the aural noise 212d exceeding an ambient noise threshold indicated by the aural noise threshold 158.

As represented by block 330c, in some implementations, the method 300 includes providing a set of one or more haptic responses. In some implementations, the method 300 includes selecting a haptic presentation mode in response to determining that an amount of aural noise breaches an aural noise threshold and an amount of visual noise breaches a visual noise threshold. For example, as shown in FIG. 1D, the content presentation engine 130 selects the haptic presentation mode 140-3 in response to the visual noise 150 exceeding the visual noise threshold 152 and the aural noise 156 exceeding the aural noise threshold 158, and the electronic device 102 outputs the haptic responses 160 corresponding to the content 104.

As represented by block 330d, in some implementations, the content is associated with a default presentation mode that is different from the first presentation mode, and the method 300 includes converting the content from the default presentation mode to the first presentation mode. For example, as discussed in relation to FIG. 2, in some implementations, the presentation mode converter 240 converts the content 252 from the default presentation mode 254 to the selected presentation mode 222.

In some implementations, the method 300 includes converting a visual portion of the content into speech and outputting the speech via a speaker coupled with the device. For example, in some implementations, the presentation mode converter 240 performs scene analysis on an image, generates a description of the image based on the scene analysis, and aurally outputs the description of the image.

In some implementations, the method 300 includes converting an audio portion of the content into a visual representation (e.g., text or an image) and displaying the visual representation on a display coupled with the device. For example, in some implementations, the presentation mode converter 240 performs a text-to-speech conversion for text, and aurally outputs the speech. In some implementations, the presentation mode converter 240 performs scene analysis on a video or an image in order to generate a description of the video or the image, and outputs a readout of the description.

In some implementations, the method 300 includes converting a visual portion or an audio portion of the content into a set of one or more haptic responses and outputting the set of one or more haptic responses. For example, in some implementations, the presentation mode converter 240 generates haptic responses that correspond to text, video, image or audio in the content. In some implementations, the method 300 includes generating the haptic responses based on a set of rules that map types of visual or audio content to certain haptic responses.

In some implementations, the method 300 includes switching from the first presentation mode to a second presentation mode of the plurality of presentation modes based on subsequent environmental data. For example, as shown in FIG. 1E, the content presentation engine 130 selects the visual presentation mode 140-1 when subsequent environmental data indicates that the visual noise 162 is lower than the visual noise threshold 152.

In some implementations, the method 300 includes receiving a request to present the content. In some implementations, the method 300 includes receiving a user input that specifies the request to present the content.

In some implementations, the content includes augmented reality (AR) content. In some implementations, the content is to be overlaid onto a representation of a physical environment. In some implementations, the content is to be overlaid onto a pass-through (e.g., an optical pass-through or a video pass-through) of the physical environment.

FIG. 4A is a block diagram of a device 400 that presents content in accordance with some implementations. In some implementations, the device 400 implements the electronic device 102, the content presentation engine 130 and/or the content presentation engine 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the presentation mode selector 220, and the content presenter 230. In various implementations, the device 400 performs the method 300 shown in FIG. 3.

In some implementations, the data obtainer 210 obtains environmental data associated with a physical environment (e.g., the environmental data 212 shown in FIG. 2). In some implementations, the data obtainer 210 performs the operation(s) represented by block 310 in FIG. 3. To that end, the data obtainer 210 includes instructions 210a, and heuristics and metadata 210b.

In some implementations, the presentation mode selector 220 selects a presentation mode for the content based on the environmental data. In some implementations, the presentation mode selector 220 performs the operations(s) represented by block 320 shown in FIG. 3. To that end, the presentation mode selector 220 includes instructions 220a, and heuristics and metadata 220b.

In some implementations, the content presenter 230 presents the content in accordance with the presentation mode selected by the presentation mode selector 220. In some implementations, the content presenter 230 performs the operation(s) represented by block 330 shown in FIG. 3. To that end, the content presenter 230 includes instructions 230a, and heuristics and metadata 230b.

In some implementations, the one or more I/O devices 410 include an environmental sensor for capturing environmental data (e.g., the environmental data 212 shown in FIG. 2). In some implementations, the one or more I/O devices 410 include an image sensor (e.g., a camera) for capturing the image 212a and/or the visual noise 212c shown in FIG. 2. In some implementations, the one or more I/O devices 410 include an ambient light sensor (ALS) for capturing the visual noise 212c shown in FIG. 2. In some implementations, the one or more I/O devices 410 include a microphone for capturing the sound 212b and/or the aural noise 212d shown in FIG. 2. In some implementations, the one or more I/O devices 410 include a display for displaying the content 104 (shown in FIGS. 1A-1E) and/or the content 252 (shown in FIG. 2) in the visual presentation mode 140-1. In some implementations, the one or more I/O devices 410 include a speaker for outputting the content 104 (shown in FIGS. 1A-1E) and/or the content 252 (shown in FIG. 2) in the aural presentation mode 140-2. In some implementations, the one or more I/O devices 410 include a haptic device for providing haptic responses (e.g., the haptic responses 160 shown in FIG. 1D). In some implementations, the haptic device includes a vibrational device that generates vibrations. In some implementations, the haptic device includes a motor with an unbalanced load for generating vibrations.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

FIG. 4B illustrates a blow-up view of an optical see-through display 420 in accordance with some implementations. In various implementations, the optical see-through display 420 includes a selectively occlusive layer 450 that includes a number of pixel elements that, when activated, block light from passing through the optical see-through display 420. Thus, through appropriate addressing of the selectively occlusive layer 450, the optical see-through display 420 can render a black region 451 or a gray region 452. In various implementations, the optical see-through display 420 includes a globally dimmable layer 460 that, according to a controllable dimming level, dims light passing through the optical see-through display 420. In various implementations, the globally dimmable layer 460 includes one or more of a photochromic element, electrochromic element, an SPD (suspended-particle device) element, GHLC (guest-host liquid crystal) element, or PDLC (polymer-dispersed liquid-crystal) element. In various implementations, the optical see-through display 420 includes a light addition layer 470 that includes a number of pixel elements that, when activated, emit light towards the user. Thus, through appropriate addressing of the light addition layer 470, the optical see-through display 420 can render a white (or colored) virtual object 471. In various implementations, the optical see-through display 420 does not include each of the layers 450, 460, 470. In particular, in various implementations, the optical see-through display 420 does not include the selectively occlusive layer 450 and/or the globally dimmable layer 460. In various implementations, the optical see-through display 420 does not include the light addition layer 470 and/or the globally dimmable layer 460. In various implementations, the optical see-through display 420 does not include the selectively occlusive layer 450 and/or the light addition layer 470.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, a non-transitory memory and one or more processors coupled with the display and the non-transitory memory:
      determining to present content in a visual presentation mode, wherein the content is associated with a visual characteristic;
      obtaining environmental data that indicates a visual noise associated with a physical environment in which the device is located;
      determining whether the visual noise exceeds a visual noise threshold that is a function of the visual characteristic of the content;
      in response to the visual noise exceeding the visual noise threshold:
         forgoing presentation of the content in the visual presentation mode; and
         presenting the content in a second presentation mode that is different from the visual presentation mode.

2. The method of claim 1, wherein presenting the content in the second presentation mode comprises playing the content as audio on a speaker coupled with the device.

3. The method of claim 1, wherein the visual noise exceeds the visual noise threshold when an amount of ambient light breaches an ambient lighting threshold that is a function of the visual characteristic of the content; and
   wherein presenting the content in the second presentation mode comprises playing the content as audio on a speaker coupled with the device.

4. The method of claim 1, wherein the visual noise exceeds the visual noise threshold when a color value of pixels where the content is to be displayed matches a color of the content; and
   wherein presenting the content in the second presentation mode comprises playing the content as audio on a speaker coupled with the device.

5. The method of claim 1, wherein presenting the content in the second presentation mode comprises providing a set of one or more haptic responses.

6. The method of claim 1, further comprising:
   while presenting the content in the second presentation mode, switching from the second presentation mode to the visual presentation mode based on subsequent environmental data indicating that the visual noise is below the visual noise threshold.

7. The method of claim 1, wherein the content is associated with a default presentation mode that is different from the second presentation mode; and
   wherein presenting the content in the second presentation mode comprises converting the content from the default presentation mode to the first presentation mode.

8. The method of claim 1, wherein obtaining the environmental data comprises capturing an image of the physical environment.

9. The method of claim 1, wherein obtaining the environmental data comprises measuring an amount of ambient light in the physical environment.

10. The method of claim 1, wherein the content includes augmented reality (AR) content and the display includes an optical see-through display.

11. The method of claim 1, wherein the visual noise represents an amount of similarity between the visual characteristic of the content and an optical characteristic of the physical environment.

12. The method of claim 1, wherein the visual noise indicates an amount of similarity between colors utilized in the content and colors of physical articles in the physical environment.

13. The method of claim 1, wherein the content is to be overlaid onto a pass-through of the physical environment;
   wherein the visual noise indicates a number of physical articles that are in the physical environment; and
   wherein the visual noise threshold indicates a threshold number of physical articles.

14. The method of claim 1, wherein the content is to be overlaid onto a pass-through of the physical environment;
   wherein the visual noise indicates a percentage of the physical environment that is occupied by physical articles; and
   wherein the visual noise threshold indicates a threshold percentage.

15. The method of claim 1, wherein the visual noise threshold is set to a first value in response to the display being an opaque display; and
   wherein the visual noise threshold is set to a second value in response to the display being an optical see-through display.

16. A non-transitory memory storing one or more programs, which, when executed by one or more processors of a device, cause the device to:
   determine to present content in a visual presentation mode, wherein the content is associated with a visual characteristic;
   obtain environmental data that indicates a visual noise associated with a physical environment in which the device is located;
   determine whether the visual noise exceeds a visual noise threshold that is a function of the visual characteristic of the content;
   in response to the visual noise exceeding the visual noise threshold:
      forgo presentation of the content in the visual presentation mode; and
      present the content in a second presentation mode that is different from the visual presentation mode.

17. The non-transitory memory of claim 16, wherein the visual noise represents an amount of similarity between the visual characteristic of the content and an optical characteristic of the physical environment.

18. The non-transitory memory of claim 16, wherein the visual noise indicates an amount of similarity between colors utilized in the content and colors of physical articles in the physical environment.

19. The non-transitory memory of claim 16, wherein the content is to be overlaid onto a pass-through of the physical environment;
   wherein the visual noise indicates a number of physical articles that are in the physical environment; and
   wherein the visual noise threshold indicates a threshold number of physical articles.

20. The non-transitory memory of claim 16, wherein the visual noise threshold is set to a first value in response to the device having an opaque display; and
   wherein the visual noise threshold is set to a second value in response to the device having an optical see-through display.

21. A device comprising:
   one or more processors;
   a non-transitory memory;
   one or more displays; and
   one or more programs stored in the non-transitory memory, which, when executed by the one or more processors, cause the device to:
      determine to present content in a visual presentation mode, wherein the content is associated with a visual characteristic;
      obtain environmental data that indicates a visual noise associated with a physical environment in which the device is located;
      determine whether the visual noise exceeds a visual noise threshold that is a function of the visual characteristic of the content;
      in response to the visual noise exceeding the visual noise threshold:
         forgo presentation of the content in the visual presentation mode; and
         present the content in a second presentation mode that is different from the visual presentation mode.

22. The device of claim 21, wherein the visual noise represents an amount of similarity between the visual characteristic of the content and an optical characteristic of the physical environment.

23. The device of claim 21, wherein the visual noise indicates an amount of similarity between colors utilized in the content and colors of physical articles in the physical environment.

24. The device of claim 21, wherein the content is to be overlaid onto a pass-through of the physical environment;
   wherein the visual noise indicates a number of physical articles that are in the physical environment; and
   wherein the visual noise threshold indicates a threshold number of physical articles.

25. The device of claim 21, wherein the content is to be overlaid onto a pass-through of the physical environment;
   wherein the visual noise indicates a percentage of the physical environment that is occupied by physical articles; and
   wherein the visual noise threshold indicates a threshold percentage.

* * * * *